R. GOODWIN.
CHURN.
No. 2,603.  PATENTED MAY 4, 1842.
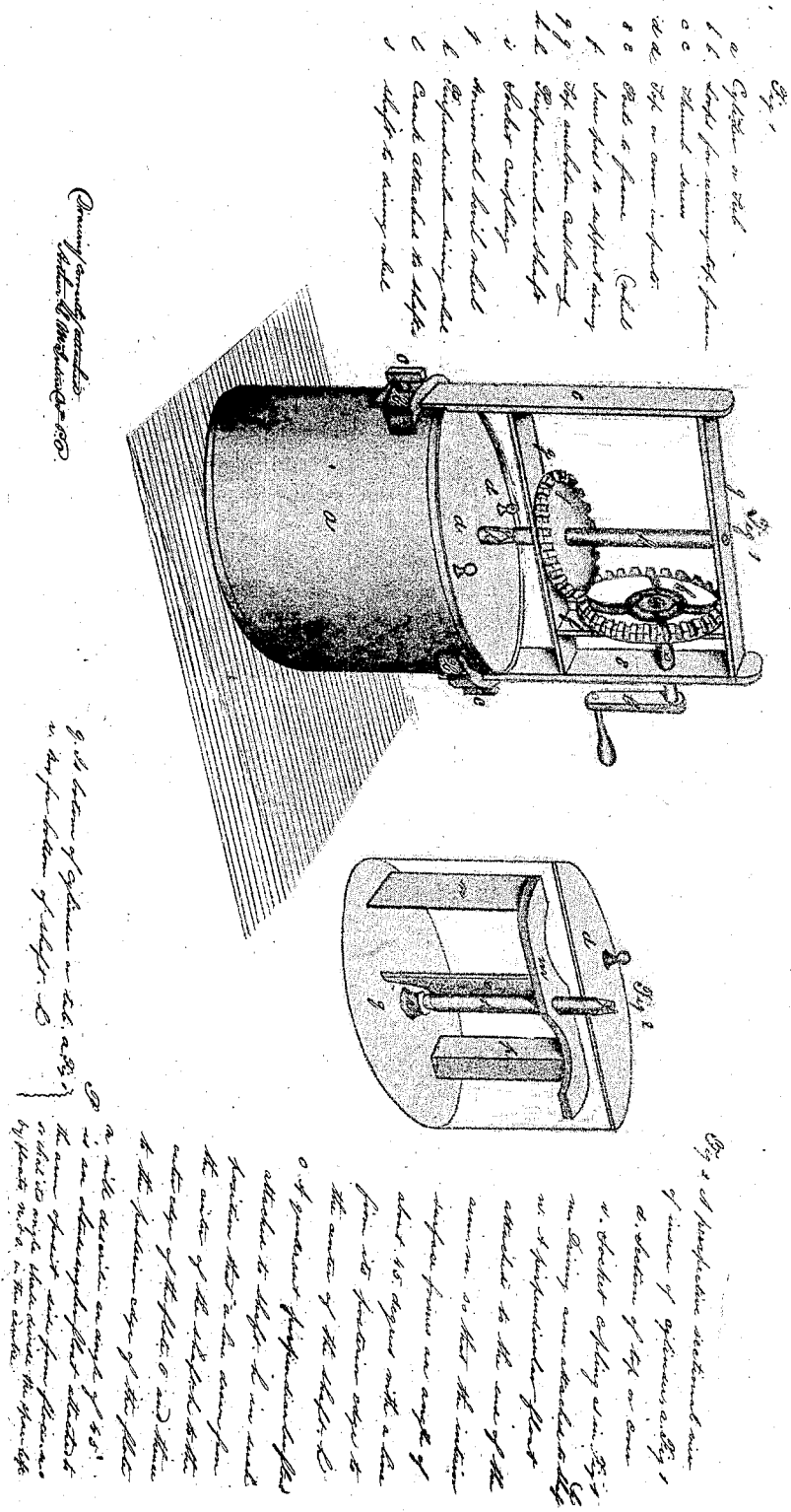

UNITED STATES PATENT OFFICE.

RODERICK GOODWIN, OF NORTH BERGEN, NEW YORK.

CHURN.

Specification of Letters Patent No. 2,603, dated May 4, 1842.

*To all whom it may concern:*

Be it known that I, RODERICK GOODWIN, of North Bergen, in the county of Genesee and State of New York, have invented a new and useful improvement on machines or churns for the purpose of churning cream and making butter therefrom, which machine with the said improvement I call the improved rotary stirring-churn; and I do hereby declare that the following is a full, clear, and exact description of the construction and operation of the same, reference being had to the annexed drawings, making a part of this specification, in which—

Figure 1 is a perspective view of the whole churn, and Fig. 2 of the floats and interior machinery.

In the first place I make a tub or cylinder of any convenient diameter and height with a substantial bottom, which cylinder is marked *a* on Fig. 1 of the said drawing, and the bottom *q*, on Fig. 2. On the center of the bottom I elevate a box or socket marked *r* on Fig. 2, for the bottom of a shaft to turn in. Near the top on opposite sides of the cylinder I fasten two loops marked *c, c*, in Fig. 1, with thumb screws passing through the same in the center. In the loops I insert the bottoms of two posts (*e, e*, Fig. 1,) of an upright frame and secure the same by the thumb screws, so that the frame can be raised or lowered or taken off at pleasure; the tops of the two posts I connect by a cross beam (*g*, Fig. 1,) and again by a bottom cross beam (*g*, Fig. 1,) the latter being at such a distance from the bottoms of the posts as shall leave room for a coupling joint (*i*, Fig. 1,) in the shafts above the top of the cylinder when the frame is attached to it. At a distance from one of the posts of about one sixth of the length of the cross beams, or at any other convenient distance, I insert an upright inner post (*f*, Fig. 1,) between the cross beams and parallel to the other posts, and half way between the top and bottom cross beams perforate said inner post and the outer post nearest to it horizontally to fit them for the reception and support of a shaft. I then insert therein a shaft (*s*, Fig. 1,) proportioned in size to the driving wheel below mentioned and sufficient to support it, the ends of which shaft stick through the inner post and outer post in which it is inserted. To the outer end of this shaft I attach a crank (*l*, Fig. 1,) and on the inner end I fasten a perpendicular mitered driving wheel (*k*, Fig. 1,) of such size as I choose. I then insert a perpendicular shaft through the middle of the cross beams, (see *h*, Fig. 1,) and fix upon it a little above the bottom cross beam a horizontal mitered wheel (*j*, Fig. 1,) so as to unite with and be propelled by the driving wheel, and of about half the size of the latter, though the size and proportions of said wheel may be varied at pleasure. I then insert the lower end of another perpendicular shaft (*h*, Fig. 2,) in the box or socket on the bottom of such length as to reach a little above the top of the cylinder and of the same size as the other perpendicular shaft. On the upper end of the lower perpendicular shaft I make a square tenon, and in the bottom of the upper one a socket to correspond, so that when the ends of the outer posts are inserted in the loops on the cylinder and the top frame pressed down the upright shafts are united by a coupling joint (*i*, Fig. 1,) so that when a rotary motion is given to the upper shaft by turning the crank it is communicated through the upper to the lower. A little below the top of the cylinder I fasten on the lower upright shaft a horizontal arm (*m*, Fig. 2,) one end of which extends from the shaft so near to the inner side of the cylinder as to leave barely room for it to pass around freely without obstruction, and the opposite end of the arm I make a little shorter. To the long end of the arm I attach firmly a perpendicular float (*n*, Fig. 2,) its outer edge being parallel to the sides of the churn and reaching nearly to the bottom being in width about one third of the length from the shaft to the end of the arm to which it is attached, and placed in such position that the side of the float would form an angle of about forty five degrees with a line drawn from its inner edge to the center of the lower shaft. To the under side of the arm and to the side of said lower shaft next the aforesaid float I attach firmly by the upper end and one edge another perpendicular float (*o*, Fig. 2,) reaching nearly to the bottom, cut out at the lower end so as not to interfere with the socket in which the lower shaft is inserted, concave on the side next the shaft and convex on the other, so as to describe the quadrant of a circle a little over half as wide as the other float, and in such position that a line drawn from the center of the shaft to which it is fixed to its outer edge, and thence to the inner or posterior edge of the first mentioned float, will describe an angle of about forty five degrees. To the short end of the arm I fix perpendicularly a float (*p*, Fig. 2,) also reaching nearly to the bottom. The side of which that is to follow the others is shaped into an obtuse angle of about forty five degrees, and the other side sunk or furrowed to correspond, its width being about the same as the first mentioned float, and it being attached to the arm at such a distance from the lower shaft that in going around it divides in the middle the space left by the other two floats. In the top of the cylinder I insert two lids (*d, d,* Fig. 1,) each covering one half the area of the circle of the inside of the cylinder, and which can be taken out at pleasure. I make a hole in the center of the lids where they come together, through which comes the lower shaft (*h*, Fig. 1,) and considerably larger than the shaft so as to admit a free passage of air around it to and from the inside of the churn. The whole may be made of wood, or partly of wood and partly of iron or other metal. The top frame should correspond in size with the cylinder and the driving wheel to be placed in it.

The cylinder top frame and interior machinery can be separated in a moment for the purpose of cleaning and as readily united.

The machine is put in motion by the crank (*l*, Fig. 1,) and when in operation the said floats revolve around the lower shaft inside the cylinder.

What I claim as my invention and a useful improvement in said machine is—

The shape, position, arrangement and relative situation of said floats as attached to said arm as aforesaid, and as proposed to be used in connection with the rest of said machine, by which when it is in operation, a gyratory motion of the fluid to be acted on inside the churn is prevented, it being thrown inwardly toward the said lower shaft, by the first mentioned float, and by the second back toward the sides of the churn, and the volume passed between those two constantly divided in the middle and thrown each way by the obtuse angle of the float thirdly above mentioned, and every part of the fluid rapidly stirred and exposed to the action of the air admitted through the aperture in the lids around the lower shaft and the process of making butter from cream facilitated and shortened, while none of it is thrown out at the top by the revolving of said floats.

RODERICK GOODWIN

Witnesses:
JEROME FULLER,
GEORGE F. BARNETT.